United States Patent

[11] 3,568,894

| [72] | Inventors | Kenneth M. Allen; |
| | | Chester H. Harper, Newberg, Oreg. |
| [21] | Appl. No. | 792,510 |
| [22] | Filed | Jan. 21, 1969 |
| [45] | Patented | Mar. 9, 1971 |
| [73] | Assignee | Allen-Harper, Inc. |
| | | Newberg, Oreg. |

[54] MEANS TO METER GRANULAR OR PARTICULATE MATERIAL
10 Claims, 8 Drawing Figs.

[52] U.S. Cl. .................................................. 222/410, 222/199
[51] Int. Cl. .................................................. G01f 11/00
[50] Field of Search .................................. 302/(Inquired); 198/53, 56; 219/17; 222/200, 199, 233, 238, 410; 239/659

[56] References Cited
UNITED STATES PATENTS

| 490,631 | 1/1893 | Ransome | 222/199X |
| 535,260 | 3/1895 | Mc Pherson | 222/199 |
| 949,400 | 2/1910 | McAfee | 222/199 |
| 2,189,018 | 2/1940 | Robinson | 222/410X |
| 2,726,792 | 12/1955 | Seymour | 222/199 |
| 2,729,362 | 1/1956 | Hughes | 222/199X |
| 3,123,256 | 3/1964 | Smith et al. | 222/410X |

*Primary Examiner*—Samuel F. Coleman
*Assistant Examiner*—Norman L. Stack, Jr.
*Attorney*—Buckhorn, Blore, Klarquist and Sparkman ABSTRACT: Apparatus to meter granular or particulate material including a bottomless hopper, means to introduce granular or particulate material into the hopper, a horizontal plate disposed beneath said hopper, the edges of said plate extending outwardly of said hopper, the plate supporting the material within said hopper with a portion of the material peripherally exterior of the hopper and resting on the plate at its angle of repose, and means to oscillate the plate in its plane to distribute the material over the edges thereof.

KENNETH M. ALLEN
CHESTER H. HARPER
INVENTORS.

BY
BUCKHORN, BLORE, KLARQUIST & SPARKMAN
ATTORNEYS

PATENTED MAR 9 1971
3,568,894
SHEET 2 OF 2
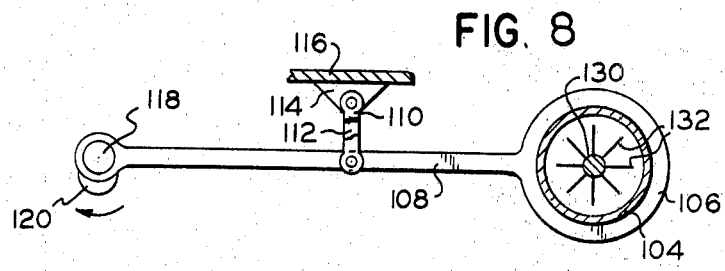
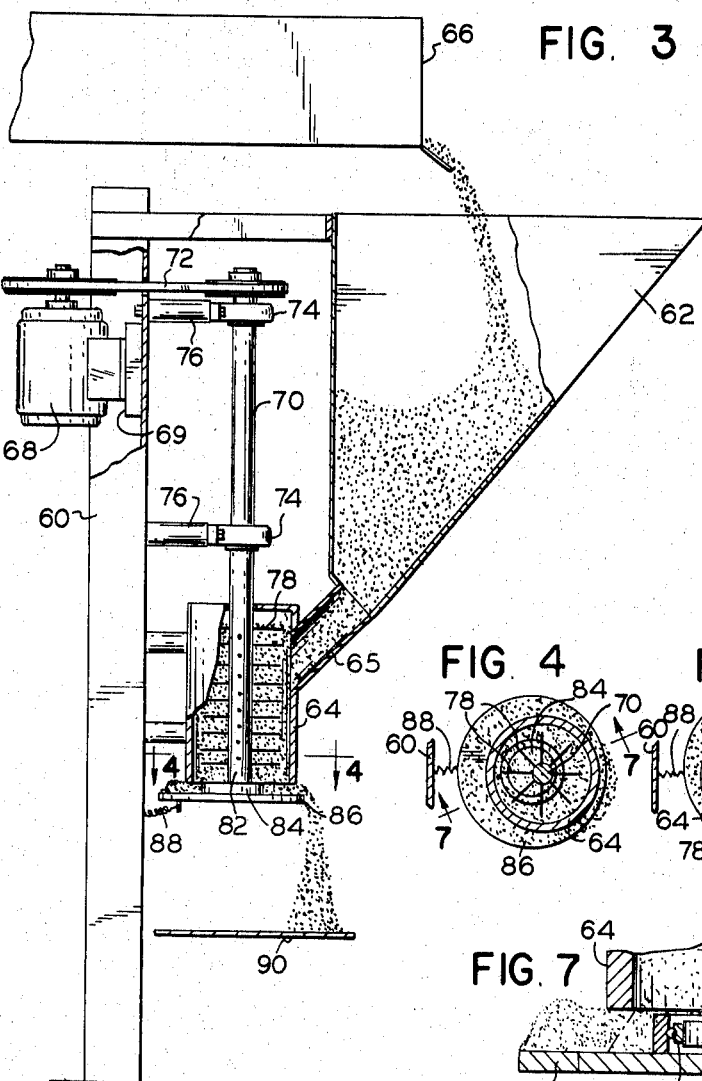
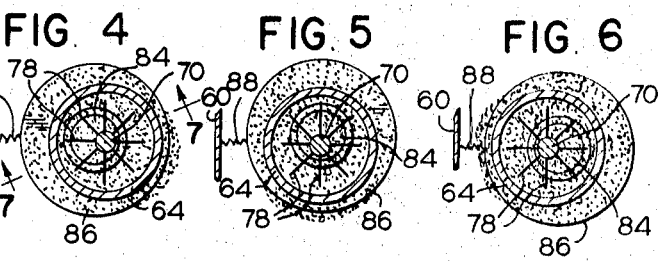
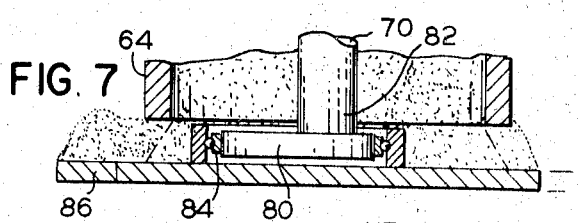
KENNETH M. ALLEN
CHESTER H. HARPER
INVENTORS.
BY
BUCKHORN, BLORE, KLARQUIST & SPARKMAN
ATTORNEYS

MEANS TO METER GRANULAR OR PARTICULATE MATERIAL

BACKGROUND OF THE INVENTION

This invention relates to metering apparatus, and more particularly to apparatus adapted to meter a granular or particulate material. For example, the apparatus of the present invention is particularly suitable for salting potato chips, dusting baked goods with powered sugar and similar functions.

The objects of the present invention are to provide metering apparatus of the class described capable of effecting a very even and controlled distribution of particulate or granular material, thereby to achieve very accurate distribution thereof.

A further object of the present invention is to provide metering apparatus not affected by the head or load of material therein.

A still further object of the present invention is to provide apparatus of the class described that will utilize the natural angle of repose of the material being distributed as a means of effecting the accurate distribution thereof.

SUMMARY OF THE INVENTION

The apparatus of the present invention achieves these and other objects and advantages by comprising a bottomless hopper and means to introduce a granular or particulate material of the class described into said hopper. A horizontal plate is disposed beneath the bottom of the hopper with the edges of the plate extending outwardly of the hopper. The plate serves as a support for the material within the hopper with a portion of the material resting on the plate peripherally exteriorly of the hopper at its natural angle of repose. The apparatus further comprises means to oscillate the plate in its plane to push the material over the edges thereof. Specifically, material resting on the edges of the plate and held there by gravity is pushed off the plate as the plate is moved, a measured amount of the product from the hopper being added to the plate. Adjustment of the spacing of the plate beneath the hopper determines the amount of material that is pushed over the edges of the plate during each oscillation thereof.

BRIEF DESCRIPTION OF THE DRAWINGS

FIG. 3 is a side elevational view partly in section of a metering apparatus forming an alternate embodiment of the invention;

FIGS. 4, 5 and 6 are horizontal sectional views taken on line 4-4 of FIG. 3 illustrating the horizontal plate of the apparatus in different positions;

FIG. 7 is a vertical sectional view taken along line 7-7 of FIG. 3; and

FIG. 8 is a horizontal sectional view of a metering apparatus forming an alternate embodiment of the invention.

Figure 1:
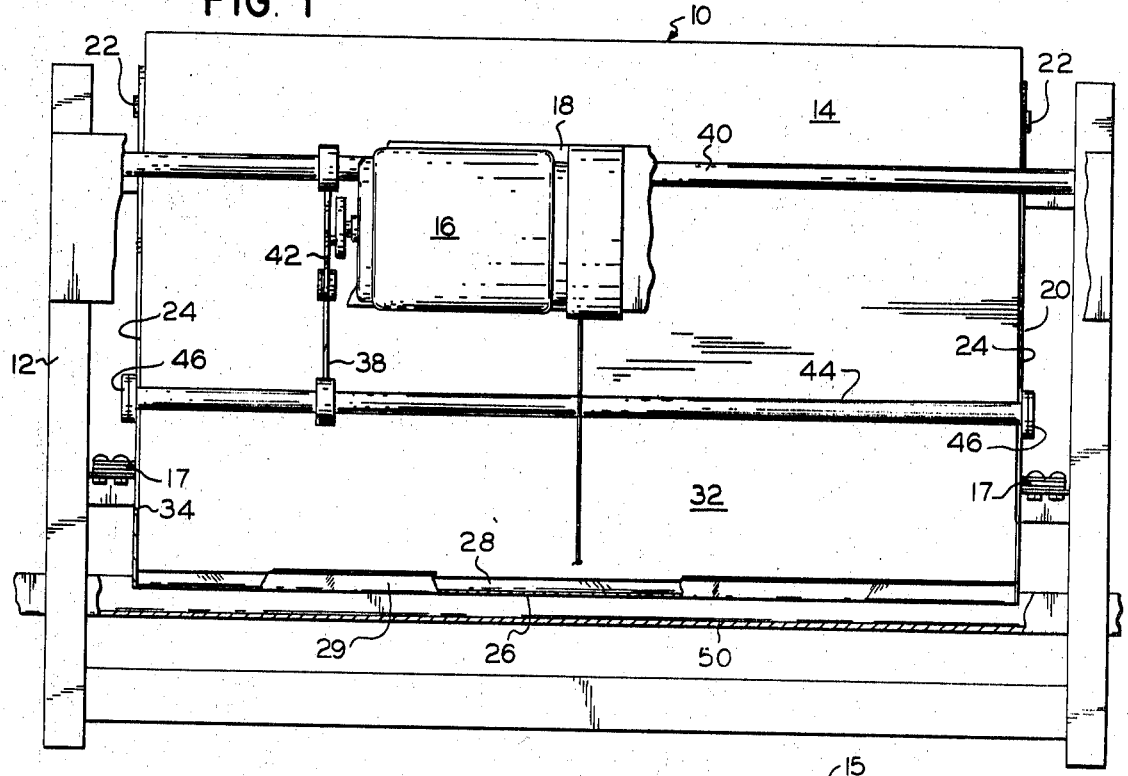
FIG. 1 is a side elevational view with parts broken away of a metering apparatus constructed in accordance with this invention.
Figure 2:
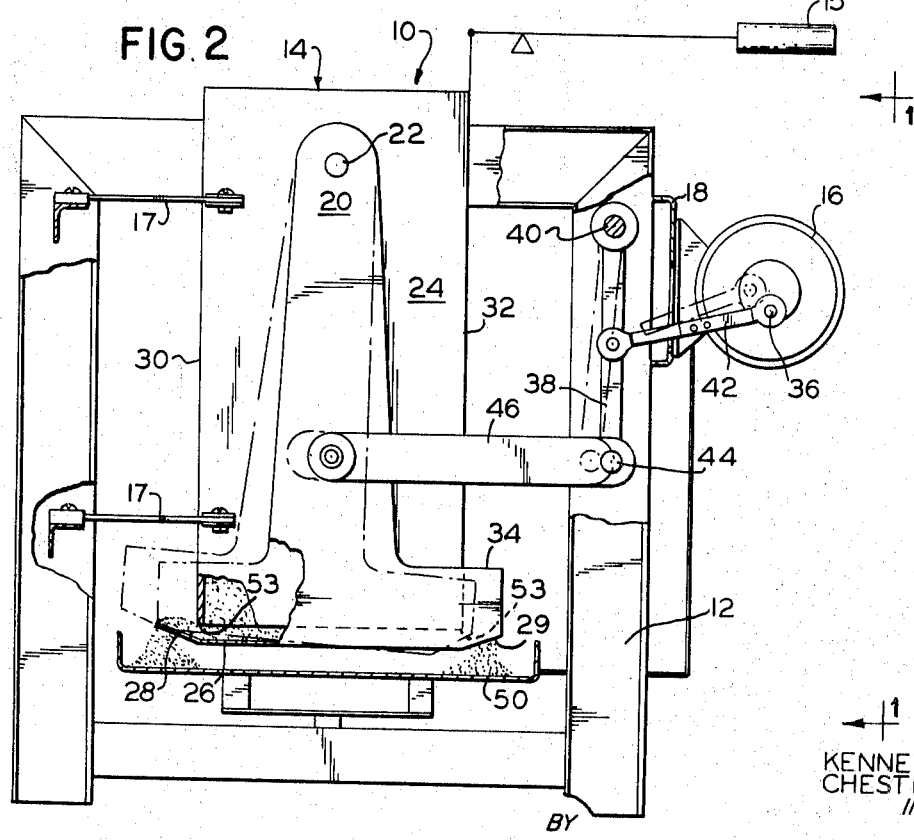
FIG. 2 is a view taken on line 2-2 of FIG. 1.

Referring to the drawings, and in particular to FIGS. 1 and 2, a metering apparatus 10 there illustrated includes a frame 12 to which is bolted a bottomless hopper 14 adapted to receive a wide variety of granular or particulate materials such as seasoning sugar, salt, berries, or vegetables like corn and green peas. Scale means 15 is connected to one side of the hopper, and spring arms 17 support the other side of the hopper.

An electrical motor 16 is mounted on a member 18 attached to the frame 12. Rocker arms 20 are pivotally mounted on pins 22 to each side 24 of the hopper 14, and a generally horizontal, roughly arcuate plate 26 is attached to the bottoms of the arms 20 such that the plate 26 is positioned slightly below the bottom of the hopper 14 and centered on the pins 22.

Edge portions 28, 29 of the plate 26 are positioned somewhat outwardly from walls 30 and 32, respectively, of the hopper 14 and are tilted slightly upwardly to retain the material which falls through the hopper 14 onto the plate 26. In effect, the plate 26 and the edge portions 28 and 29 are chords of an arc or cylinder centered on the pins 22, which are aligned with each other. The arms 20 are extended at their bottoms 34 to coincide with the contour of the plate 26. A portion of the material contained within the hopper 14 will thus rest on the plate 26 peripherally exteriorly of the hopper 14, and the slope of this exterior material on plate 26 will be at its angle of repose. (The angle of repose of any material is the angle with the horizontal at which the material will stand when piled.)

An eccentrically mounted crank 36 on the motor 16 is attached by a connecting rod 42 to an arm 38 pivotally mounted at its top 39 on a rod 40 extending between the sides of the frame 12 at the rear of the hopper 14. The arm 42 is connected to a rod 44 which extends parallel to the rod 40, but is not attached to the frame 12. The rod 44 is attached at its ends to horizontal arms 46 which in turn are attached to the rocker arms 20 on each side of the hopper 14. The motor 16 thus imparts a reciprocating motion to the crank 36 which in turn rotates the arm 38 about the rod 40. Such imparts a horizontal back-and-forth motion to the rod 44, which causes a rotation of the rocker arms 20 about their points of attachment 22, thereby to cause a forward and rearward oscillatory movement of the plate 26 beneath the bottomless hopper 14. A vibrating perforated plate or screen 50 is positioned beneath the plate 26 to distribute the granular material evenly onto articles conveyed by a conveyor 51.

Granular material is introduced into the hopper 14 to keep the hopper at least partly full and substantially above bottom edges 53 of the hopper walls 30 and 32. The material rests on the pate 26, with that portion of the material peripherally exterior of the hopper 14 reclining on the plate 26 at its angle of repose. The amount of material peripherally exterior of the hopper 14 will thus depend on the spacing of the plate 26 beneath the hopper 14, since the angle of repose of the material remains constant regardless of gravity.

As the motor 16 rotates and causes the plate 26 to move horizontally to the right, as viewed in FIG. 2, the material previously placed by the hopper on the plate 26 and held there by gravity will be pushed off the left edge 28 of the plate 26 onto the vibrating plate 50. As the plate 26 then moves horizontally to the left (or forwardly), it pushes off the plate 26 the material deposited on the right edge portion of the plate 29, letting it fall to the vibrating screen 50, which in turn evenly sprinkles any product moving under it. With each movement of the plate 26, a measured amount of the product is added thereto, at the angle of repose, filling the void left by the previously sprinkled material. The range of movement of the plate 26 is such that neither edge of the plate 26 is so close to the edge 53 that material would flow from the hopper over the edge of the plate 26. Adjustment of the spacing of the plate 26 beneath the hopper 14 in effect determines the amount of material that is fed onto the plate and is pushed off the plate in each stroke of the plate in its oscillation. Accordingly the apparatus is capable of effecting a very even, controlled and metered distribution of particulate or granular material, thereby achieving very accurate distribution thereof.

EMBODIMENT OF FIGS. 3 TO 7

A metering apparatus forming an alternate embodiment of the invention includes a frame 60 supporting a funnellike chute 62 and a bottomless cylindrical hopper 64, the chute 62 communicating with the hopper 64 as at 65 and being adapted to funnel granular or particulate materials therein, which materials are introduced into the chute from a metering conveyor 66. An electric motor 68 is mounted on a bracket 69 on the frame 60 and is adapted axially to rotate a shaft 70 at a predetermined rate of speed by means of a belt drive 72. The shaft 70 is coaxially mounted within the hopper 64 and is supported in bearings 74 above the hopper 64 by means of two brackets 76 bolted to the frame 60. A plurality of radially extending wire breakers 78 are attached to the shaft 70 within the hopper 64 to agitate the material therein as the shaft 70 rotates.

As shown in FIGS. 4—7, a cam 80 is eccentrically mounted on the lower end 82 of the shaft 70 and rotates within a radial-and-thrust bearing 84 supported by and rotatable on the cam 80. A horizontal circular plate or disc 86 is mounted coaxially on the exterior race of the bearing 84, and is restrained against axial rotation by a spring 88 connecting the plate 86 to the frame 60. Thus, when the motor 68 rotates the shaft 70, the eccentrically mounted cam 80 causes the bearing 84 and the plate 86 to oscillate in a circular pattern in the horizontal plane.

As in the case of the embodiment of FIGS. 1 and 2, the plate 86 is positioned slightly below bottom edge 89 of the hopper 64 and its edge extends radially outwardly of the hopper 64 a distance always slightly beyond the angle of repose of the granular or particulate material. Thus a portion of the material within the hopper 64 will rest on the plate 86 peripherally exterior of the hopper 64, the slope of this exterior material being at its angle of repose.

A conveyor 90 is positioned beneath the plate 88. When material is introduced into the hopper 64 through the chute 62, it will fall therethrough and ultimately rest on the plate 86. The outer portion of the material peripherally exterior of the hopper 64 reclines on the plate 86 at its angle of repose. The amount of material peripherally exterior of the hopper 64 will thus depend upon the eccentric throw and the spacing of the plate 86 beneath the hopper 64 since the angle of repose of the material remains constant regardless of gravity. Stated otherwise, if metering more material is desired peripherally exterior of the hopper, a greater spacing between the plate 86 and the bottom of the hopper 64 will be selected; if metering less material is desired exterior of the hopper, a smaller spacing will be selected.

As the motor 68 rotates and causes the plate 86 to oscillate horizontally in a circular path, material previously distributed by the hopper on the plate 86 and held there by gravity will be pushed off into the conveyor 90 as the portion of the plate 86 near the periphery thereof is moved under the hopper. Specifically, when the cam 80 forces the bearing 84, and hence the plate 86, to the left (FIG. 7), the material on the right side of the plate 86 is pushed off as the plate attempts to push the material back under the hopper. As the cam 80 forces the plate 86 to the right, as viewed in FIG. 7, material will fall off the left-hand edge of the plate 86. Actually, the material is pushed off uniformly around the entire periphery of the circular plate 86 as the latter is moved in a circle without rotation.

The gap between the plate 86 (FIG. 7) and bottom edge 89 of the hopper 64, which edge 89, in the embodiment disclosed, is parallel to the plate, is preferably at least several times the average thickness of the particles of particulate material being metered. The upper surface of the plate may be quite frictional or it may have a very low coefficient of friction. If the upper surface is roughened or otherwise formed to have a high coefficient of friction, in metering the material, as the plate 86 is moved the particles in contact with the plate, that is, the lowest layer of particles, are held by friction with the plate against appreciable movement relative to the plate and move with the plate, the speed of movement of the plate being sufficiently slow that acceleration force and shear force are not greater than the frictional force at the upper face of the plate. This causes the material to always cover the full upper face of the plate and the material on the plate outside the hopper to always be at least as great as the gap between the hopper and the plate. When an outer portion of the plate is being pushed under the plate, the column of material in the hopper prevents the material on the plate and outside the column from moving into the column and the material bunches up on the portion of the plate outside the column and portions of this material bunch up above the edge 89, which blocks its movement and the excess slides off the peripheral edge of the plate. If the upper surface of the plate has a low coefficient of friction, as by making a very smooth metal surface or by coating the upper surface with a layer of low friction material such as, for example, polytetrafluoroethylene, the metering is even better. In the latter low friction construction, considering the portion of the plate moving out from under the column of material in the hopper and the adjacent lower edge of the hopper, there is no opposition to movement of the material with the plate and the material moves out from the column under the adjacent lower edge of the hopper to keep the outer portion of the plate filled with material in a layer equal to the gap between the lower edge of the hopper and the plate. In the latter, low friction construction, considering the edge portion of the plate moving toward the hopper, the resistance to movement of the layer of the material outside the hopper back into the column of the material in the hopper is sufficient to cause the plate to slide out from under the material and drop over the peripheral edge of the material.

The rate of feed of the material may be varied by adjusting the hopper vertically relative to the place or vice versa. It also may be varied by increasing or decreasing the speed of the oscillating drive, a variable speed electric motor being used to effect the drive of the plate.

EMBODIMENT OF FIG. 8

A metering apparatus forming an alternate embodiment of the invention includes a hopper 104 held in a fixed position and always maintained in a condition at least partially filled with granular material to be metered. A circular plate or disc 106 is spaced below the hopper and is supported and moved circularly by a rod 108 rigid therewith. The rod is supported pivotally on a pair of links 110 and 112 pivotally mounted on a hanger bracket 114 fixed to a fixed frame 116. A pin 118 of a crankshaft 120 driven by a variable speed motor (not shown) is rotated continuously by the crankshaft to move the plate 106 in a generally circular path eccentric to the cylinder and the granular material is continuously pushed off the plate. The bottom edge of the hopper is horizontal and is spaced a predetermined distance above the plate, which is horizontal also. A shaft 130 carrying agitating fingers 132 extends substantially to the bottom of the hopper and is rotated continuously to prevent packing or bridging of the material. The rod 108 pivots as a lever about its pin connection to the links 110 and 112. Hence, the magnitude of the throw of the disc 106 in the direction normal to the rod is dependent on the relative lengths of the lever arms thereof at opposite sides of the links, while the throw of the disc in the direction along the rod is equal to the throw of the crank pin 118. The hanger bracket 114 is adjustable along the frame 116 in a direction parallel to the rod and the pin connection between the links and the rod is adjustable along the rod. This permits the leverage to be changed to vary from a circle where the lever arms are equal to elliptical. For distributing material uniformly across on a conveyor below the disc 106 and traveling at a uniform speed in a horizontal direction transversely of the rod 108, the length of the arm portion of the rod from the links 110 and 112 to the crank pin 118 in one-quarter of the length of the arm portion from the links 110 and 112 to the center of the disc 106. This gives a four to one amplification of the crank throw to the movement of the disc in the direction transverse to the length of the rod 108.

We claim:

1. In an apparatus for metering particulate material:

a hopper open at its bottom for holding particulate material of a predetermined maximum thickness in a column therein;

a bottom plate disposed beneath and covering the projected area of the hopper and onto which plate said material falls;

the plate being spaced below the lower edge of the wall of the hopper a distance several times greater than said maximum thickness;

the edges of said plate being positioned outwardly of the hopper beyond the angle of repose of the material on the plate;

means to oscillate the plate at least partially transversely of the wall of the hopper to push material over the edge of the plate;

a vertical shaft coaxially mounted within said hopper;

cam means eccentrically mounted on the bottom of said shaft;

bearing means coaxially journaled on said cam means;

said horizontal plate being attached to said bearing means; and means to axially rotate said shaft to cause said cam means to oscillate said bearing means and said plate.

2. The apparatus of claim 1 further comprising means attached to said shaft within said hopper to agitate said material therein.

3. The apparatus of claim 2 in which said agitating means comprise a plurality of radially extending wires attached to said shaft with said hopper.

4. The apparatus of claim 1 further comprising means to prevent said horizontal plate from rotating about its vertical axis.

5. The apparatus of claim 4 in which said preventing means comprises spring means attached to said plate.

6. The apparatus of claim 5 in which said plate oscillates in a generally circular pattern.

7. The apparatus of claim 1 in which said horizontal plate comprises a circular plate.

8. The apparatus of claim 7 in which said circular plate is coaxial with said bearing means.

9. In a metering apparatus:

a hopper comprising a vertical cylinder having a lower discharge portion open at the bottom thereof and adapted to laterally confine a vertical column of particulate material;

a bottom disc;

means mounting the bottom disc below the opening and spaced from the bottom edge of the discharge portion of the hopper a distance several times the average thickness of particulate material in the hopper and supporting the disc for oscillating movement thereof at least partially transverse to the wall of the discharge portion between extremes in which the entire outer edge of the plate is positioned outwardly beyond the angle of repose of the column of material in the hopper and on the plate; and drive means for effecting such oscillating movement of the plate and comprising an eccentric drive serving to oscillate the plate in a circular path centered on the hopper.

10. The apparatus of claim 9 including means for preventing rotation of the plate relative to the hopper.